US012027110B2

(12) United States Patent
Park et al.

(10) Patent No.: US 12,027,110 B2
(45) Date of Patent: Jul. 2, 2024

(54) DISPLAY APPARATUS AND METHOD OF DRIVING THE SAME

(71) Applicant: Samsung Display Co., LTD., Yongin-si (KR)

(72) Inventors: Junhyun Park, Yongin-si (KR); Jangmi Kang, Yongin-si (KR); Hyeongseok Kim, Yongin-si (KR); Minjae Jeong, Yongin-si (KR); Mukyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/363,556

(22) Filed: Aug. 1, 2023

(65) Prior Publication Data

US 2024/0096270 A1 Mar. 21, 2024

(30) Foreign Application Priority Data

Sep. 16, 2022 (KR) ........................ 10-2022-0117070

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/0275* (2013.01); *G09G 2320/0247* (2013.01)

(58) Field of Classification Search
CPC ............. G09G 3/32; G09G 2300/0842; G09G 2310/0267; G09G 2310/0275; G09G 2320/0247
See application file for complete search history.

(56) References Cited

U.S. PATENT DOCUMENTS

| | | | | |
|---|---|---|---|---|
| 2016/0365024 A1* | 12/2016 | Pyo | ...................... | G09G 3/3233 |
| 2021/0056910 A1* | 2/2021 | Chung | ................... | G11C 19/28 |
| 2021/0383759 A1* | 12/2021 | Park | ..................... | G09G 3/3233 |
| 2022/0059016 A1* | 2/2022 | Baek | .................... | G09G 3/3233 |

(Continued)

FOREIGN PATENT DOCUMENTS

| | | |
|---|---|---|
| KR | 10-2021-0054114 A | 5/2021 |
| KR | 10-2021-0106052 A | 8/2021 |
| KR | 10-2339821 B1 | 12/2021 |

*Primary Examiner* — Andrew Sasinowski
(74) *Attorney, Agent, or Firm* — Lewis Roca Rothgerber Christie LLP

(57) ABSTRACT

A display apparatus includes a display panel including a pixel, a gate driver providing a gate signal to the pixel, a data driver providing a data voltage to the pixel and an emission driver providing an emission signal to the pixel. The pixel includes a driving switching element applying a driving current to the light emitting element, a storage capacitor connected to the driving switching element, a bias capacitor connected to the storage capacitor and receiving a bias gate signal, a threshold voltage compensation switching element connected to an electrode of the driving switching element and a light emitting element initialization switching element connected to an electrode of the light emitting element. A control signal applied to an electrode of the threshold voltage compensation switching element and a control signal applied to an electrode of the light emitting element initialization switching element are generated from different signal generators.

20 Claims, 12 Drawing Sheets

(56) References Cited

U.S. PATENT DOCUMENTS

| | | | | |
|---|---|---|---|---|
| 2022/0335884 | A1* | 10/2022 | Lee | G09G 3/32 |
| 2023/0099387 | A1 | 3/2023 | Park et al. | |
| 2023/0245619 | A1* | 8/2023 | Yoon | G09G 3/3208<br>345/691 |

* cited by examiner

DISPLAY APPARATUS AND METHOD OF DRIVING THE SAME

CROSS-REFERENCED TO RELATED APPLICATION

This application claims priority to and the benefit of Korean Patent Application No. 10-2022-0117070, filed on Sep. 16, 2022 in the Korean Intellectual Property Office KIPO, the content of which is herein incorporated by reference in its entirety.

BACKGROUND

1. Field

Aspects of embodiments of the present disclosure relate to a display apparatus and a method of driving the same. For example, embodiments of the present disclosure relate to a display apparatus for enhancing a display quality by reducing a horizontal line defect in a variable frequency driving and a method of driving the same.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

The above information disclosed in this Background section is for enhancement of understanding of the background of the present disclosure, and therefore, it may contain information that does not constitute prior art.

SUMMARY

In a display apparatus for supporting a low frequency driving and a variable frequency driving, a data writing cycle for writing data and a bias cycle for applying bias to a driving switching element may be different from each other. When the data writing cycle and the bias cycle are different from each other, a horizontal line pattern may be displayed on the display panel.

For example, when a data writing frequency is 240 Hz and a bias frequency is 480 Hz, one horizontal line pattern may be displayed in a central portion of the display panel. For example, when the data writing frequency is 120 Hz and the bias frequency is 480 Hz, three horizontal line patterns may be displayed in a ¼ portion, a ½ portion and a ¾ portion of the display panel.

In the data writing cycle, all of a data writing gate signal, a compensation gate signal, a bias gate signal, an initialization gate signal may be scanned. However, in the bias cycle, the data writing gate signal may not be scanned but the compensation gate signal, the bias gate signal, the initialization gate signal may be scanned. Depending on the data writing cycle and the bias cycle, the type and the number of pulses to be scanned may differ so that a difference of luminance of the display panel may occur. The horizontal line pattern may be generated due to the difference of the luminance of the display panel.

Embodiments of the present disclosure are directed to a display apparatus for supporting low frequency driving and variable frequency driving, and for enhancing a display quality of a display panel by preventing or reducing a horizontal line defect using a signal generator generating a gate signal applied to a threshold voltage compensation switching element and a signal generator generating a gate signal applied to a light emitting element initialization switching element which are separated.

Embodiments of the present disclosure are directed to a method of driving the display apparatus.

In an embodiment of a display apparatus according to the present disclosure, the display apparatus includes a display panel, a gate driver, a data driver and an emission driver. The display panel includes a pixel. The gate driver is configured to provide a gate signal to the pixel. The data driver is configured to provide a data voltage to the pixel. The emission driver is configured to provide an emission signal to the pixel. The pixel includes a light emitting element. The pixel includes a driving switching element configured to apply a driving current to the light emitting element, a storage capacitor connected to a control electrode of the driving switching element, a bias capacitor including a first electrode connected to the storage capacitor and a second electrode configured to receive a bias gate signal, a threshold voltage compensation switching element connected to an output electrode of the driving switching element and a light emitting element initialization switching element connected to an anode electrode of the light emitting element. A control signal applied to a control electrode of the threshold voltage compensation switching element and a control signal applied to a control electrode of the light emitting element initialization switching element are generated from different signal generators.

In an embodiment, the storage capacitor may include a first electrode connected to the control electrode of the driving switching element and a second electrode connected to the first electrode of the bias capacitor.

In an embodiment, the first electrode of the bias capacitor may be connected to the control electrode of the driving switching element.

In an embodiment, the pixel may further include a data initialization switching element connected to an output electrode of the threshold voltage compensation switching element and configured to apply an initialization voltage to the output electrode of the threshold voltage compensation switching element.

In an embodiment, a control signal applied to a control electrode of the data initialization switching element and the control signal applied to the control electrode of the light emitting element initialization switching element may be generated from the same signal generator.

In an embodiment, the control signal applied to the control electrode of the data initialization switching element may be an N-th initialization gate signal. The control signal applied to the control electrode of the light emitting element initialization switching element may be an (N+1)-th initialization gate signal. N is a positive integer.

In an embodiment, a control signal applied to a control electrode of the data initialization switching element and the control signal applied to the control electrode of the threshold voltage compensation switching element may be generated from the same signal generator.

In an embodiment, the control signal applied to the control electrode of the data initialization switching element may be an (N−3)-th first compensation gate signal.

The control signal applied to the control electrode of the threshold voltage compensation switching element may be an N-th first compensation gate signal. N is a positive integer.

In an embodiment, the pixel may further include a data voltage applying switching element configured to apply the data voltage to the storage capacitor and a first leakage compensation switching element between the storage capacitor and the data voltage applying switching element.

In an embodiment, the pixel may further include a second leakage compensation switching element including an input electrode connected to the control electrode of the driving switching element and a control electrode connected to a control electrode of the first leakage compensation switching element.

In an embodiment, the driving switching element and the data voltage applying switching element may be P-type transistors. The first leakage compensation switching element and the second leakage compensation switching element may be N-type transistors.

In an embodiment, the gate driver may include a first signal generator configured to generate a second compensation gate signal applied to the control electrode of the first leakage compensation switching element, a second signal generator configured to generate a first compensation gate signal applied to the control electrode of the threshold voltage compensation switching element, a third signal generator configured to generate an initialization gate signal applied to the control electrode of the light emitting element initialization switching element, a fourth signal generator configured to generate the bias gate signal and a fifth signal generator configured to generate a data writing gate signal applied to a control electrode of the data voltage applying switching element.

In an embodiment, the gate driver may include a pair of first signal generators configured to generate a second compensation gate signal applied to the control electrode of the first leakage compensation switching element and at a first side and at a second side of the display panel, a second signal generator configured to generate a first compensation gate signal applied to the control electrode of the threshold voltage compensation switching element and at the first side of the display panel, a third signal generator configured to generate an initialization gate signal applied to the control electrode of the light emitting element initialization switching element and at the second side of the display panel, a pair of fourth signal generators configured to generate the bias gate signal and at the first side and at the second side of the display panel and a pair of fifth signal generators configured to generate a data writing gate signal applied to a control electrode of a data voltage applying switching element and at the first side and at the second side of the display panel.

In an embodiment, the pixel may further include an emission switching element between the driving switching element and the light emitting element and a reference voltage applying switching element connected to an output electrode of the data voltage applying switching element and configured to apply a reference voltage to the output electrode of the data voltage applying switching element.

In an embodiment of a display apparatus according to the present disclosure, the display apparatus includes a display panel, a gate driver, a data driver and an emission driver. The display panel includes a pixel. The gate driver is configured to provide a gate signal to the pixel. The data driver is configured to provide a data voltage to the pixel. The emission driver is configured to provide an emission signal to the pixel. The pixel includes a light emitting element, a driving switching element configured to apply a driving current to the light emitting element, a storage capacitor connected to a control electrode of the driving switching element, a first bias switching element connected to the driving switching element and configured to apply a bias voltage to the driving switching element, a threshold voltage compensation switching element connected to an output electrode of the driving switching element and a light emitting element initialization switching element connected to an anode electrode of the light emitting element. A control signal applied to a control electrode of the threshold voltage compensation switching element and a control signal applied to a control electrode of the light emitting element initialization switching element are generated from different signal generators.

In an embodiment, the pixel may further include a data initialization switching element connected to an output electrode of the threshold voltage compensation switching element and configured to apply an initialization voltage to the output electrode of the threshold voltage compensation switching element.

In an embodiment, the pixel may further include a data voltage applying switching element configured to apply the data voltage to the storage capacitor and a first leakage compensation switching element between the storage capacitor and the data voltage applying switching element.

In an embodiment, the pixel may further include a second leakage compensation switching element including an input electrode connected to the control electrode of the driving switching element and a control electrode connected to a control electrode of the first leakage compensation switching element.

In an embodiment, the driving switching element and the data voltage applying switching element may be P-type transistors. The first leakage compensation switching element and the second leakage compensation switching element may be N-type transistors.

In an embodiment of a method of driving a display apparatus according to the present disclosure, the method includes providing a gate signal to a pixel of a display panel, providing a data voltage to the pixel and providing an emission signal to the pixel. The pixel includes a driving switching element configured to apply a driving current to the light emitting element, a storage capacitor connected to a control electrode of the driving switching element, a bias capacitor including a first electrode connected to the storage capacitor and a second electrode configured to receive a bias gate signal, a threshold voltage compensation switching element connected to an output electrode of the driving switching element and a light emitting element initialization switching element connected to an anode electrode of the light emitting element. A control signal applied to a control electrode of the threshold voltage compensation switching element and a control signal applied to a control electrode of the light emitting element initialization switching element are generated from different signal generators.

According to the display apparatus and the method of driving the display apparatus, the pixel includes the leakage compensation switching element connected to the storage capacitor so that the current leakage may be reduced in the display apparatus for supporting the low frequency driving and the variable frequency driving. Accordingly, the flicker may not occur by the luminance difference according to the driving frequency due to the current leakage in the pixel.

In some embodiments, the signal generator generating the gate signal applied to the threshold voltage compensation switching element and the signal generator generating the gate signal applied to the light emitting element initialization switching element may be separated so that the load of the threshold voltage compensation and the load of the light emitting element initialization may be separated in the display apparatus for supporting the low frequency driving and the variable frequency driving. The difference between the load of the threshold voltage compensation and the load of the light emitting element initialization is reduced so that the horizontal line defect in which the unintended horizontal line pattern is displayed on the display panel may be prevented or reduced. Thus, the display quality of the display panel may be enhanced in the display apparatus for supporting the low frequency driving and the variable frequency driving.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Hereinafter, embodiments of the present disclosure will be described in more detail with reference to the accompanying drawings.

Figure 1:
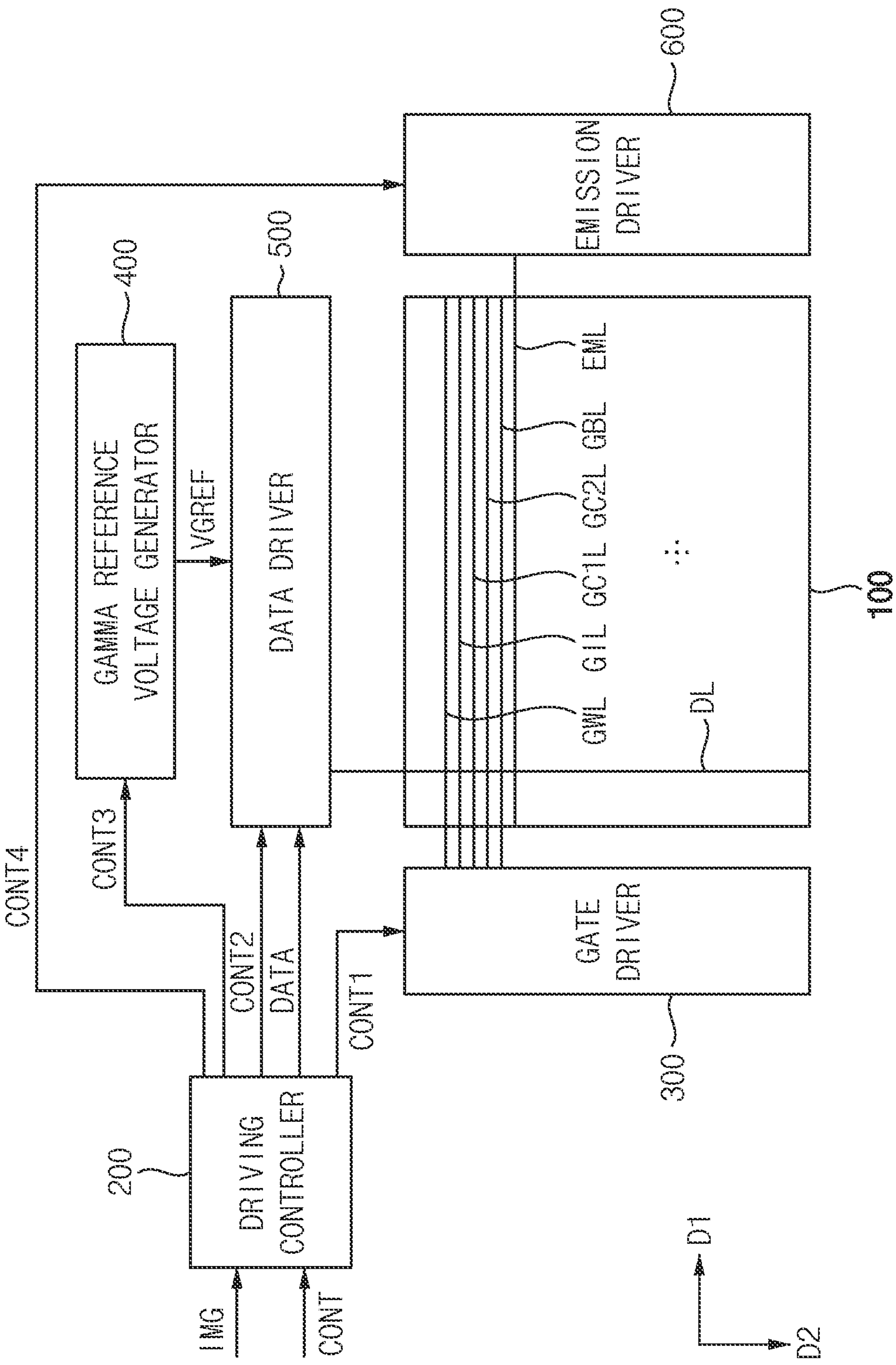
FIG. 1 is a block diagram illustrating a display apparatus according to an embodiment of the present disclosure.

FIG. 1 is a block diagram illustrating a display apparatus according to an embodiment of the present disclosure.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region adjacent to the display region.

The display panel 100 includes a plurality of gate lines GWL, GIL, GC1L, GC2L and GBL, a plurality of data lines DL, a plurality of emission lines EML and a plurality of pixels electrically connected to the gate lines GWL, GIL, GC1L, GC2L and GBL, the data lines DL and the emission lines EML. The gate lines GWL, GIL, GC1L, GC2L and GBL may extend in a first direction D1, the data lines DL may extend in a second direction D2 crossing the first direction D1 and the emission lines EML may extend in the first direction D1.

The driving controller 200 receives input image data IMG and an input control signal CONT from an external apparatus. For example, the input image data IMG may include red image data, green image data and blue image data. The input image data IMG may also include white image data. The input image data IMG may further include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates corresponding gate signals driving the gate lines GWL, GIL, GC1L, GC2L and GBL in response to the first control signal CONT1 received from the driving controller 200. The gate driver 300 may sequentially output the corresponding gate signals to the gate lines GWL, GIL, GC1L, GC2L and GBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EML in response to the fourth control signal CONT4 received from the driving controller 200. The emission driver 600 may output the emission signals to the emission lines EML.

Although the gate driver 300 may be disposed at a first side of the display panel 100 and the emission driver 600 may be disposed at a second side of the display panel 100 opposite to the first side in FIG. 1, for convenience of explanation, the present disclosure not be limited thereto. For example, both of the gate driver 300 and the emission driver 600 may be disposed at the first side of the display panel 100. For example, both of the gate driver 300 and the emission driver 600 may be disposed at both sides of the display panel 100. For example, the gate driver 300 and the emission driver 600 may be integrally formed.

Figure 2:
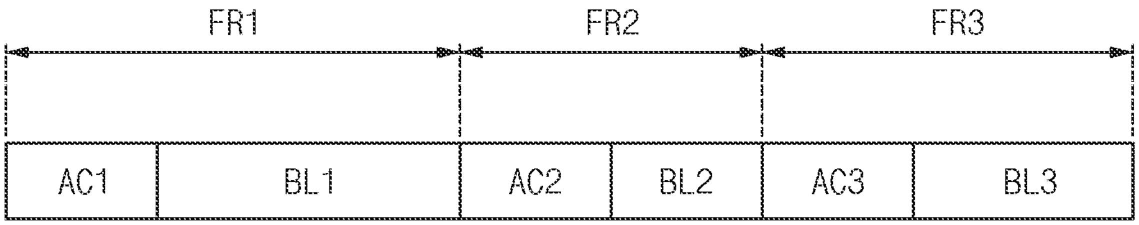
FIG. 2 is a conceptual diagram illustrating a driving frequency of a display panel of FIG. 1 according to an embodiment of the present disclosure.

FIG. 2 is a conceptual diagram illustrating a driving frequency of the display panel 100 of FIG. 1 according to an embodiment of the present disclosure.

Referring to FIGS. 1 and 2, the display panel 100 may be driven in a variable frequency. A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

The first active period AC1 may have a length the same as or substantially the same as a length of the second active period AC2. The first blank period BL1 may have a length different from a length of the second blank period BL2.

The second active period AC2 may have the length the same as or substantially the same as a length of the third active period AC3. The second blank period BL2 may have a length different from a length of the third blank period BL3.

The display apparatus for supporting the variable frequency driving may include an address scan period in which the data voltage is written to the pixel and a self scan period in which only light emission is operated without writing the data voltage to the pixel. The address scan period may be disposed in the active period AC1, AC2 and AC3. The self scan period may be disposed in the blank period BL1, BL2 and BL3.

Figure 3:
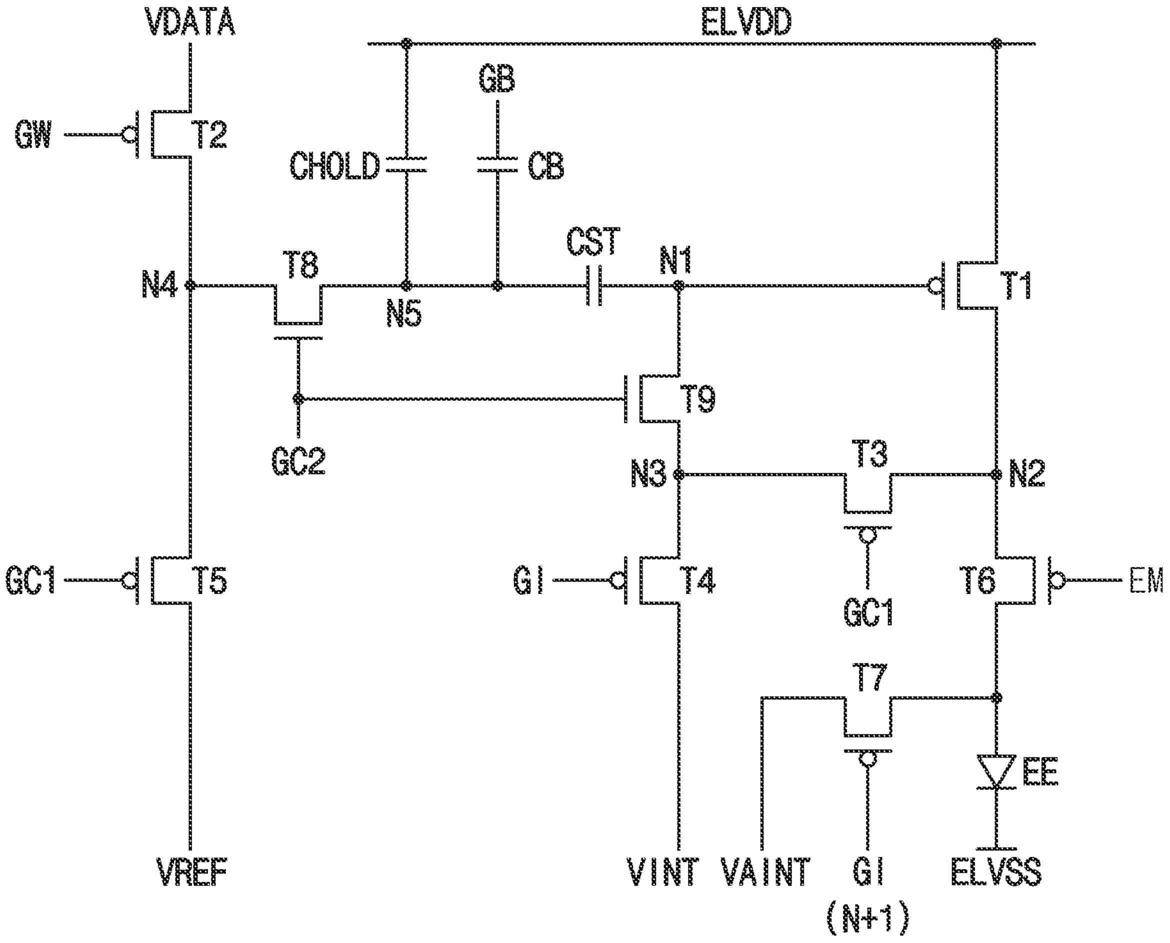
FIG. 3 is a circuit diagram illustrating an example of a pixel of the display panel of FIG. 1 according to an embodiment of the present disclosure.

FIG. 3 is a circuit diagram illustrating an example of a pixel of the display panel 100 of FIG. 1 according to an embodiment of the present disclosure.

Referring to FIGS. 1 to 3, the pixel may include a light emitting element EE, a driving switching element T1 applying a driving current to the light emitting element EE, a storage capacitor CST connected to a control electrode of the driving switching element T1 and a bias capacitor CB including a first electrode connected to the storage capacitor CST and a second electrode receiving a bias gate signal GB.

The pixel may further include a threshold voltage compensation switching element T3 connected to an output electrode of the driving switching element T1 and a light emitting element initialization switching element T7 connected to an anode electrode of the light emitting element EE.

In the present disclosure, a control signal GC1 applied to a control electrode of the threshold voltage compensation switching element T3 and a control signal GI(N+1) applied to a control electrode of the light emitting element initialization switching element T7 may be generated from different signal generators.

In the present embodiment, the storage capacitor CST may include a first electrode connected to a control electrode of the driving switching element T1 and a second electrode connected to the first electrode of the bias capacitor CB.

The pixel may further include a data initialization switching element T4 connected to an output electrode of the threshold voltage compensation switching element T3 and applying an initialization voltage VINT to the output electrode of the threshold voltage compensation switching element T3.

In the present embodiment, a control signal GI applied to a control electrode of the data initialization switching element T4 and the control signal GI(N+1) applied to the control electrode of the light emitting element initialization switching element T7 may be generated from the same signal generator.

For example, the control signal applied to the control electrode of the data initialization switching element T4 may be an N-th initialization gate signal GI and the control signal applied to the control electrode of the light emitting element initialization switching element T7 may be an (N+K)-th initialization gate signal GI(N+K). Herein, N is a positive integer and K is a positive integer. For example, K may be one. Herein, N means a stage number of a signal generator of the gate driver 300. The stage number N may not be provided from the gate signals GW, GI, GC1, GC2 and GB in FIG. 3 so that GW, GI, GC1, GC2 and GB in FIG. 3 may have the same meaning as GW(N), GI(N), GC1(N), GC2(N) and GB(N) respectively. The stage number N may not be provided from the emission signal EM in FIG. 3 so that EM in FIG. 3 may have the same meaning as EM(N).

The light emitting element initialization switching element T7 and the data initialization switching element T4 share signals that may each have a different timing generated from the same signal generator so that an increase of a resolution due to the additional signal generator of the gate driver 300 and the additional gate signal wiring may be prevented or reduced.

The pixel may further include a data voltage applying switching element T2 applying the data voltage VDATA to the storage capacitor CST and a first leakage compensation switching element T8, where the first leakage compensation switching element T8 may be disposed between the storage capacitor CST and the data voltage applying switching element T2.

For example, the driving switching element T1 and the data voltage applying switching element T2 may be P-type transistors. The first leakage compensation switching element T8 may be an N-type transistor. For example, the driving switching element T1 and the data voltage applying switching element T2 may be low temperature polysilicon (LTPS) thin film transistors. The first leakage compensation switching element T8 may be an oxide thin film transistor.

The first leakage compensation switching element T8 may be an N-type transistor so that the current leakage at the first electrode of the storage capacitor CST may be reduced in the low frequency driving. Thus, the level of the data voltage VDATA charged at the storage capacitor CST may not be reduced due to the current leakage in the low frequency driving.

The pixel may further include a second leakage compensation switching element T9 including an input electrode connected to the control electrode of the driving switching element T1 and further including a control electrode connected to a control electrode of the first leakage compensation switching element T8.

For example, the second leakage compensation switching element T9 may be an N-type transistor. For example, the second leakage compensation switching element T9 may be an oxide thin film transistor.

The second leakage compensation switching element T9 may be an N-type transistor so that the current leakage at a second electrode of the storage capacitor CST may be reduced in the low frequency driving. Thus, the level of the data voltage VDATA charged at the storage capacitor CST may not be reduced due to the current leakage in the low frequency driving.

The data initialization switching element T4 may be connected to an output electrode of the second leakage compensation switching element T9 and may apply an initialization voltage VINT to the output electrode of the second leakage compensation switching element T9.

In the present embodiment, a light emitting element initialization voltage VAINT applied to an input electrode of the light emitting element initialization switching element T7 may be different from the initialization voltage VINT applied to an input electrode of the data initialization switching element T4. By setting the level of the voltage VAINT for initializing the anode electrode of the light emitting element EE and the level of the voltage VINT for initializing the control electrode of the driving switching element T1 differently, the accuracy of initialization of the anode electrode of the light emitting element EE and the accuracy of initialization of the driving switching element T1 may be increased.

In some embodiments, the light emitting element initialization voltage VAINT and the initialization voltage VINT may be set to have the same level. Herein, an input electrode of the data initialization switching element T4 may be connected to an input electrode of the light emitting element initialization switching element T7.

The pixel may further include a reference voltage applying switching element T5 connected to an input electrode of the first leakage compensation switching element T8. In the present embodiment, the reference voltage applying switching element T5 may be a P-type transistor. In the present embodiment, a voltage applied to an input electrode of the reference voltage applying switching element T5 may be a reference voltage VREF.

The pixel may further include an emission switching element T6 that may be disposed between the driving switching element T1 and the light emitting element EE. The emission switching element T6 may connect the driving switching element T1 and the light emitting element EE in response to the emission signal EM.

The pixel may further include a hold capacitor CHOLD including a first electrode receiving a first power voltage ELVDD and a second electrode connected to a first electrode of the storage capacitor CST.

Hereinafter, the pixel structure may be further explained in more detail. The pixel may include: a first transistor T1 including a control electrode connected to a first node N1, an input electrode receiving the first power voltage ELVDD and an output electrode connected to a second node N2; a second transistor T2 including a control electrode receiving a data writing gate signal GW, an input electrode receiving the data voltage VDATA and an output electrode connected to a fourth node N4; a third transistor T3 including a control electrode receiving a first compensation gate signal GC1, an input electrode connected to a third node N3 and an output electrode connected to the second node N2; a fourth transistor T4 including a control electrode receiving an initialization gate signal GI, an input electrode receiving the initialization voltage VINT and an output electrode connected to the third node N3; a fifth transistor T5 including a control electrode receiving the first compensation gate signal GC1, an input electrode receiving the reference voltage VREF and an output electrode connected to the fourth node N4; a sixth transistor T6 including a control electrode receiving the emission signal EM, an input electrode connected to the second node N2 and an output electrode connected to the anode electrode of the light emitting element EE; a seventh transistor T7 including a control electrode receiving an initialization gate signal GI(N+1) of a next stage, an input electrode receiving the light emitting element initialization voltage VAINT and an output electrode connected to the anode electrode of the light emitting element EE; an eighth transistor T8 including a control electrode receiving a second compensation gate signal GC2, an input electrode connected to the fourth node N4 and an output electrode connected to a fifth node N5; and a ninth transistor T9 including a control electrode receiving the second compensation gate signal GC2, an input electrode connected to the first node N1 and an output electrode connected to the third node N3.

The input electrodes and the output electrodes of the transistors T1 to T9 are arbitrarily named for convenience so that the input electrodes and the output electrodes of the transistors T1 to T9 may be inversely called.

The pixel may include: the storage capacitor CST including the first electrode connected to the fifth node N5 and the second electrode connected to the first node N1; the bias capacitor CB including the first electrode connected to the fifth node N5 and the second electrode receiving the bias gate signal GB; the hold capacitor CHOLD including a first electrode receiving the first power voltage ELVDD and a second electrode connected to the fifth node N5; and the light emitting element EE including the anode electrode connected to the output electrode of the sixth transistor T6 and a cathode electrode receiving a second power voltage ELVSS.

Figure 4:
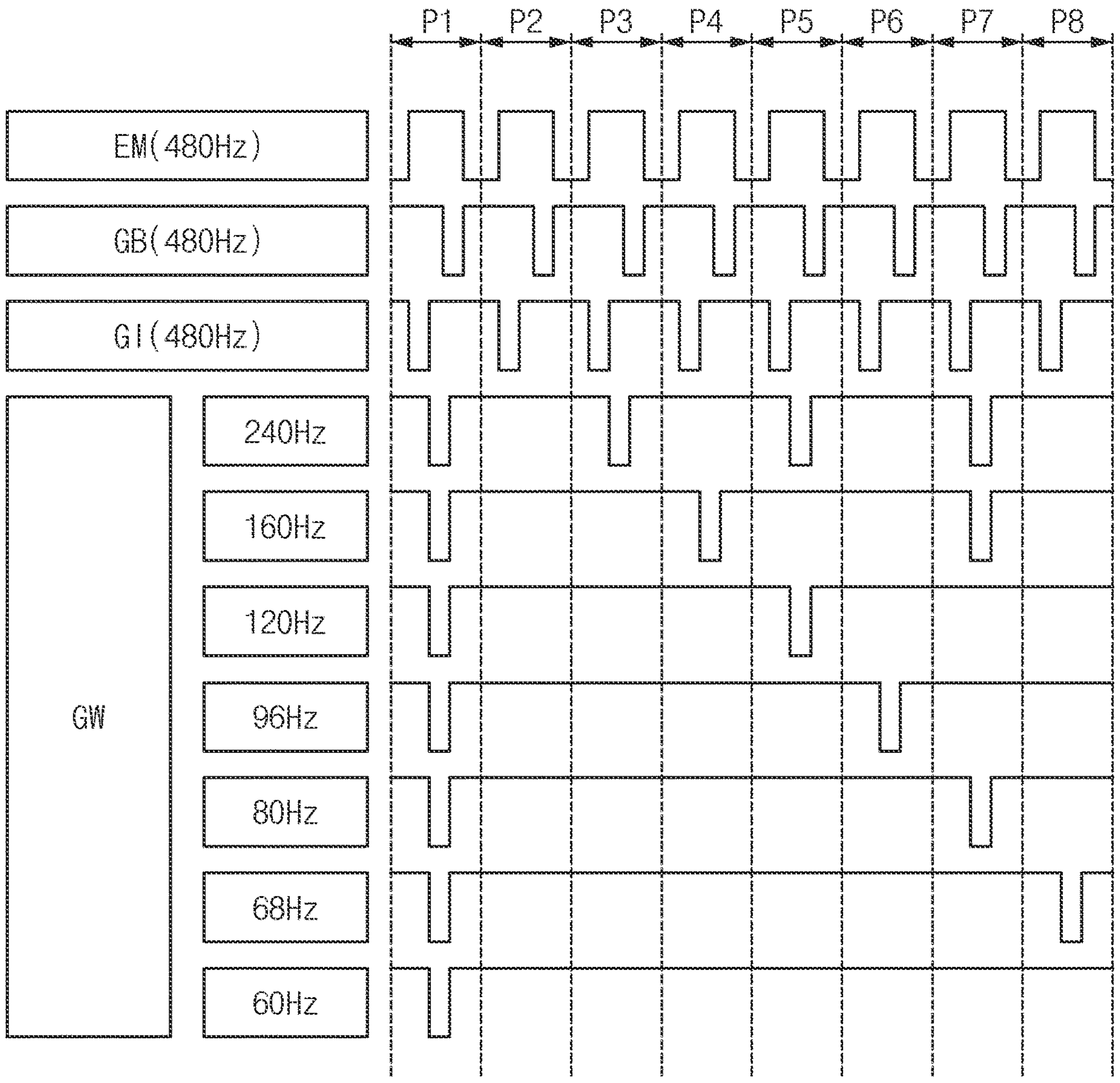
FIG. 4 is a timing diagram illustrating driving signals of the pixel of FIG. 3 when a light emitting frequency is 480 Hz according to an embodiment of the present disclosure.
Figure 5:
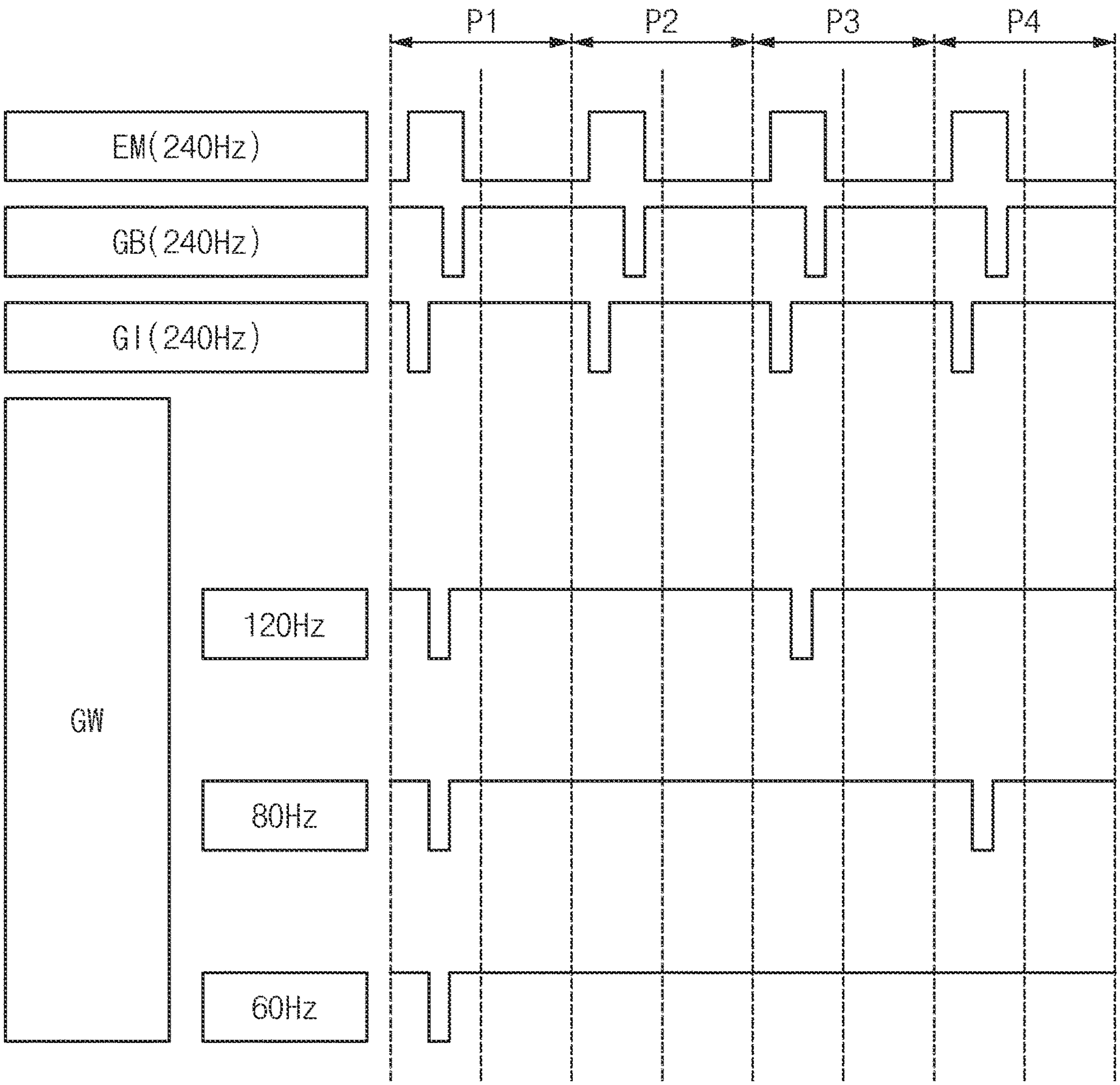
FIG. 5 is a timing diagram illustrating driving signals of the pixel of FIG. 3 when the light emitting frequency is 240 Hz according to an embodiment of the present disclosure.

FIG. 4 is a timing diagram illustrating driving signals of the pixel of FIG. 3 when a light emitting frequency is 480 Hz according to an embodiment of the present disclosure. FIG. 5 is a timing diagram illustrating driving signals of the pixel of FIG. 3 when the light emitting frequency is 240 Hz according to an embodiment of the present disclosure.

Referring to FIGS. 1 to 5, in the display apparatus for supporting the variable frequency driving, the bias operation may be operated at the control electrode or the input electrode of the driving switching element T1 of the pixel. In the present embodiment, the bias operation may be periodically operated to the control electrode of the driving switching element T1 using the bias capacitor CB and the storage capacitor CST.

As shown in FIG. 4, the display panel 100 may be driven in varied frequencies. For example, a maximum driving frequency of the display panel 100 may be 240 Hz. When the display panel 100 is driven in the driving frequency of 240 Hz, the data writing gate signal GW may have active pulses in a first period P1, a third period P3, a fifth period P5 and a seventh period P7 and a data writing operation may be operated in the first period P1, the third period P3, the fifth period P5 and the seventh period P7. Although the data writing gate signal GW has active pulses in the first period P1, the third period P3, the fifth period P5 and the seventh period P7 for convenience of explanation, the data writing operation may continue for two periods of FIG. 4. For example, when the display panel 100 is driven in 240 Hz, a first data writing operation may be operated in first and second periods P1 and P2, a second data writing operation may be operated in third and fourth periods P3 and P4, a third data writing operation may be operated in fifth and sixth periods P5 and P6 and a fourth data writing operation may be operated in seventh and eighth periods P7 and P8. When the display panel 100 is driven in the driving frequency of 120 Hz, the data writing gate signal GW may have active pulses in the first period P1 and the fifth period P5 and a data writing operation may be operated in the first period P1 and the fifth period P5. The data writing operation may continue for two periods of FIG. 4. For example, when the display panel 100 is driven in 120 Hz, a first data writing operation may be operated in first and second periods P1 and P2 and a second data writing operation may be operated in fifth and sixth periods P5 and P6.

When the display panel 100 is driven in the driving frequency of 240 Hz, a light emitting operation (EM) of the light emitting element EE may be operated in 480 Hz, an initialization operation (GI) of the light emitting element EE may be operated in 480 Hz and a bias operation (GB) of the driving switching element T1 may be operated in 480 Hz.

When the display panel 100 is driven in 240 Hz and the light emitting operation is driven in 480 Hz as explained previously, the display panel 100 may be referred to as operating in two cycles.

When the display panel 100 is driven in the driving frequency of 120 Hz, the light emitting operation (EM) of the light emitting element EE may be operated in 480 Hz, the initialization operation (GI) of the light emitting element EE may be operated in 480 Hz and the bias operation (GB) of the driving switching element T1 may be operated in 480 Hz.

When the display panel 100 is driven in 120 Hz and the light emitting operation is driven in 480 Hz as explained previously, the display panel 100 may be referred to as operating in four cycles.

In the display apparatus for supporting the variable frequency driving, a driving sequence of the display panel 100 may include an address scan period and a self scan period. In the address scan period, the data voltage may be written to the pixel. In the self scan period, the data voltage may not be written to the pixel and only light emission may be operated. In the self scan period, the data voltage may not be written to the pixel but the light emitting operation (EM) of the light emitting element EE, the initialization operation (GI) of the light emitting element EE and the bias operation (GB) of the driving switching element T1 may be operated. The first period P1 of FIG. 4 is an example of the address scan period and the second period P2 of FIG. 4 is an example of the self scan period.

As illustrated in FIG. 5, the display panel 100 may be driven in varied frequencies. For example, a maximum driving frequency of the display panel 100 may be 120 Hz. When the display panel 100 is driven in the driving frequency of 120 Hz, the data writing gate signal GW may have active pulses in a first period P1 and a third period P3 and a data writing operation may be operated in the first period P1 and the third period P3. When the display panel 100 is driven in the driving frequency of 800 Hz, the data writing gate signal GW may have active pulses in the first period P1 and a fourth period P4 and a data writing operation may be operated in the first period P1 and the fourth period P4.

Figure 6:
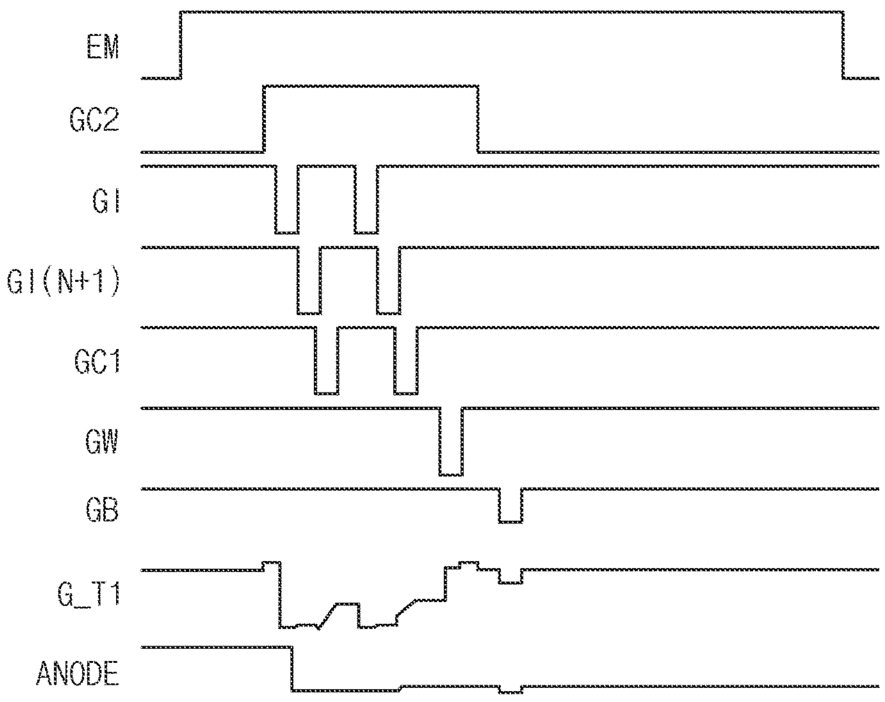
FIG. 6 is a timing diagram illustrating an example of input signals applied to the pixel of FIG. 3 and a node signal of the pixel of FIG. 3 in an address scan period according to an embodiment of the present disclosure.
Figure 7:
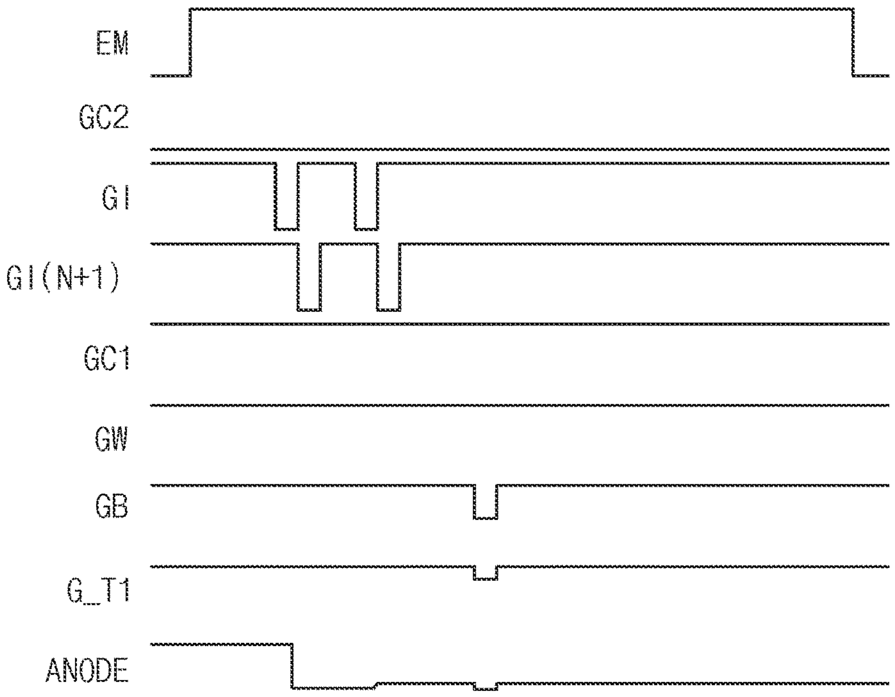
FIG. 7 is a timing diagram illustrating an example of input signals applied to the pixel of FIG. 3 and a node signal of the pixel of FIG. 3 in a self scan period according to an embodiment of the present disclosure.

FIG. 6 is a timing diagram illustrating an example of input signals applied to the pixel of FIG. 3 and illustrating a node signal of the pixel of FIG. 3 in the address scan period according to an embodiment of the present disclosure. FIG. 7 is a timing diagram illustrating an example of input signals applied to the pixel of FIG. 3 and illustrating a node signal of the pixel of FIG. 3 in the self scan period.

In FIG. 6, when the emission signal EM has a high level, the sixth transistor T6 may be turned off and, accordingly, the light emitting element EE may not emit the light. In contrast, when the emission signal EM is changed to a low level, the sixth transistor T6 may be turned on and, accordingly, the light emitting element EE may emit the light.

The second compensation gate signal GC2 may be applied to the control electrode of the eighth transistor T8 and may be applied to the control electrode of the ninth transistor T9. When the second compensation gate signal GC2 has a high level, the eighth transistor T8 and the ninth transistor T9 may be turned on.

The initialization gate signal GI may be applied to the control electrode of the fourth transistor T4. When the initialization gate signal GI has a low level, the fourth transistor T4 may be turned on and the initialization voltage VINT may be applied to the control electrode of the first transistor T1 through the fourth transistor T4 and through the ninth transistor T9.

The initialization gate signal GI(N+1) of the next stage may be applied to the control electrode of the seventh transistor T7. When the initialization gate signal GI(N+1) of the next stage has a low level, the seventh transistor T7 may be turned on and, accordingly, the light emitting element initialization voltage VAINT may be applied to the anode electrode of the light emitting element EE through the seventh transistor T7.

The first compensation gate signal GC1 may be applied to the control electrode of the third transistor T3 and may be applied to the control electrode of the fifth transistor T5.

When the first compensation gate signal GC1 has a low level, the third transistor T3 may be turned on and, accordingly, a threshold voltage of the first transistor T1 may be compensated through the third transistor T3 and through the ninth transistor T9. When the first compensation gate signal GC1 has a low level, the fifth transistor T5 may be turned on and, accordingly, the reference voltage VREF may be applied to the fifth node N5 through the fifth transistor T5 and through the eighth transistor T8.

The data writing gate signal GW may be applied to the control electrode of the second transistor T2. When the data writing gate signal GW has a low level, the second transistor T2 may be turned on and, accordingly, the data voltage VDATA may be applied to the fifth node N5 through the second transistor T2 and through the eighth transistor T8.

In the present embodiment, the bias gate signal GB may be applied to the second electrode of the bias capacitor CB. When the bias gate signal GB is applied to the second electrode of the bias capacitor CB, the bias operation may be operated at the control electrode of the driving switching element T1.

A degree of the bias of the driving switching element T1 may be determined according to the level of the bias gate signal GB so that the low level of the bias gate signal GB may not be the same as the low level of the data writing gate signal GW. For example, the low level of the bias gate signal GB may be greater than the low level of the data writing gate signal GW which may be applied to the control electrode of the data voltage writing switching element T2.

In contrast, the low level of the data writing gate signal GW, the low level of the first compensation gate signal GC1 and the low level of the initialization gate signal GI may be the same as or substantially the same as one another.

In FIG. 6, G_T1 may represent a voltage level of the control electrode of the driving switching element T1 and ANODE may represent a voltage level of the anode electrode of the light emitting element EE.

In FIG. 6, the initialization gate signal GI and the first compensation gate signal GC1 may have two low pulses so that the data initialization operation, the light emitting element initialization operation and the compensation operation of the threshold voltage of the driving switching element T1 may be operated twice. Although the initialization gate signal GI and the first compensation gate signal GC1 have two low pulses in FIG. 6, the present disclosure may not be limited thereto. In some embodiments, the initialization gate signal GI and the first compensation gate signal GC1 may have one low pulse or three or more low pulses.

FIG. 7 represents the self scan period so that the first compensation gate signal GC1, the second compensation gate signal GC2 and the data writing gate signal GW may have corresponding inactive levels during the self scan period. For example, the inactive level of the first compensation gate signal GC1 and the inactive level of the data writing gate signal GW each may be a high level and the inactive level of the second compensation gate signal GC2 may be a low level.

The initialization gate signal GI and the initialization gate signal GI(N+1) of the next stage each may have active pulses in the self scan period. When the initialization gate signal GI(N+1) of the next stage has the active pulse, the seventh transistor T7 may be turned on, and accordingly, the light emitting element initialization voltage VAINT may be applied to the anode electrode of the light emitting element EE through the seventh transistor T7.

Even though the initialization gate signal GI may have the active pulse, the second compensation gate signal GC2 may have the inactive level in the self scan period. Thus, even when the fourth transistor T4 is turned on, the initialization voltage VINT may not be applied to the first node N1 in the self scan period because the ninth transistor T9 is turned off.

In the present embodiment, the bias gate signal GB may be applied to the second electrode of the bias capacitor CB. When the bias gate signal GB is applied to the second electrode of the bias capacitor CB, the bias operation may be operated at the control electrode of the driving switching element T1.

Figure 8:
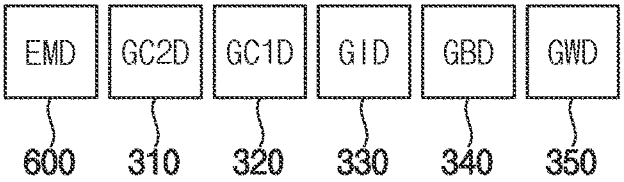
FIG. 8 is a block diagram illustrating an example of a gate driver of FIG. 1 according to an embodiment of the present disclosure.

FIG. 8 is a block diagram illustrating an example of the gate driver 300 of FIG. 1 according to an embodiment of the present disclosure.

Referring to FIGS. 1 to 8, the control signal GC1 applied to the control electrode of the threshold voltage compensation switching element T3 and the control signal GI(N+1) applied to the control electrode of the light emitting element initialization switching element T7 may be generated from different signal generators.

The gate driver 300 may include: a first signal generator GC2D (310) generating the second compensation gate signal GC2 applied to the control electrode of the first leakage compensation switching element T8; a second signal generator GC1D (310) generating the first compensation gate signal GC1 applied to the control electrode of the threshold voltage compensation switching element T3; a third signal generator GID (330) generating the initialization gate signal GI applied to the control electrode of the light emitting element initialization switching element T7; a fourth signal generator GBD (340) generating the bias gate signal GB; and a fifth signal generator GWD (350) generating the data writing gate signal GW applied to the control electrode of the data voltage applying switching element T2.

The emission driver EMD (600) may generate the emission signal EM and output the emission signal EM to the emission line EML.

Figure 9:
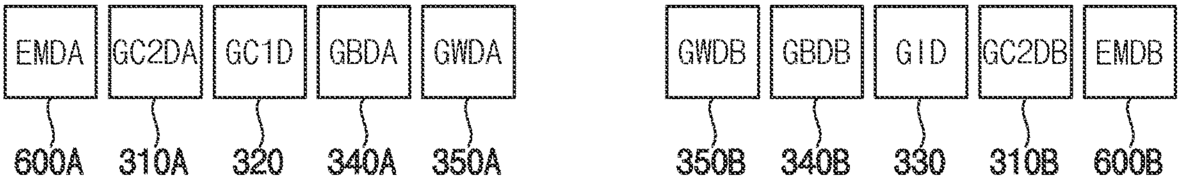
FIG. 9 is a block diagram illustrating an example of the gate driver of FIG. 1 according to an embodiment of the present disclosure.

FIG. 9 is a block diagram illustrating an example of the gate driver 300 of FIG. 1 according to an embodiment of the present disclosure.

Referring to FIGS. 1 to 7 and 9, the control signal GC1 applied to the control electrode of the threshold voltage compensation switching element T3 and the control signal GI(N+1) applied to the control electrode of the light emitting element initialization switching element T7 may be generated from different signal generators.

The gate driver 300 may include a pair of first signal generators GC2DA and GC2DB (310A and 310B) that may generate the second compensation gate signal GC2 and may be disposed at both sides of the display panel 100, a second signal generator GC1D (310) that may generate the first compensation gate signal GC1 and may be disposed at a first side of the display panel 100, a third signal generator GID (330) that may generate the initialization gate signal GI and may be disposed at a second side of the display panel 100, a pair of fourth signal generators GBDA and GBDB (340A and 340B) that may generate the bias gate signal GB and may be disposed at both sides of the display panel 100 and a pair of fifth signal generators GWDA and GWDB (350A and 350B) that may generate the data writing gate signal GW and may be disposed at both sides of the display panel 100.

The emission driver 600 may include a pair of emission signal generators EMDA and EMDB (600A and 600B) that may generate the emission signal EM and may be disposed at both sides of the display panel 100.

In the present disclosure, the control signal GC1 applied to the control electrode of the threshold voltage compensation switching element T3 and the control signal GI(N+1) applied to the control electrode of the light emitting element initialization switching element T7 may be generated from the different signal generators so that an additional signal generator may be required compared to a case in which the control signal GC1 applied to the control electrode of the threshold voltage compensation switching element T3 and the control signal GI(N+1) applied to the control electrode of the light emitting element initialization switching element T7 may be generated from the same signal generator. However, in order to separate the signal generator within a limited dead space, only one second signal generator GC1D (320) generating the first compensation gate signal GC1 may be disposed in a first side of the display panel 100 and only one third signal generator GID (330) generating the initialization gate signal GI may be disposed in a second side of the display panel 100.

According to the present embodiment, the pixel may include the leakage compensation switching element T8 and T9 connected to the storage capacitor CST so that the current leakage may be reduced in the display apparatus for supporting the low frequency driving and the variable frequency driving. Accordingly, the flicker may not occur by the luminance difference according to the driving frequency due to the current leakage in the pixel.

In some embodiments, the signal generator generating the gate signal GC1 applied to the threshold voltage compensation switching element T3 and the signal generator generating the gate signal GI(N+1) applied to the light emitting element initialization switching element T7 may be separated so that the load of the threshold voltage compensation and the load of the light emitting element initialization may be separated in the display apparatus for supporting the low frequency driving and the variable frequency driving. The difference between the load of the threshold voltage compensation and the load of the light emitting element initialization may be reduced so that the horizontal line defect in which the unintended horizontal line pattern is displayed on the display panel may be prevented or reduced. Thus, the display quality of the display panel 100 may be enhanced in the display apparatus for supporting the low frequency driving and the variable frequency driving.

Figure 10:
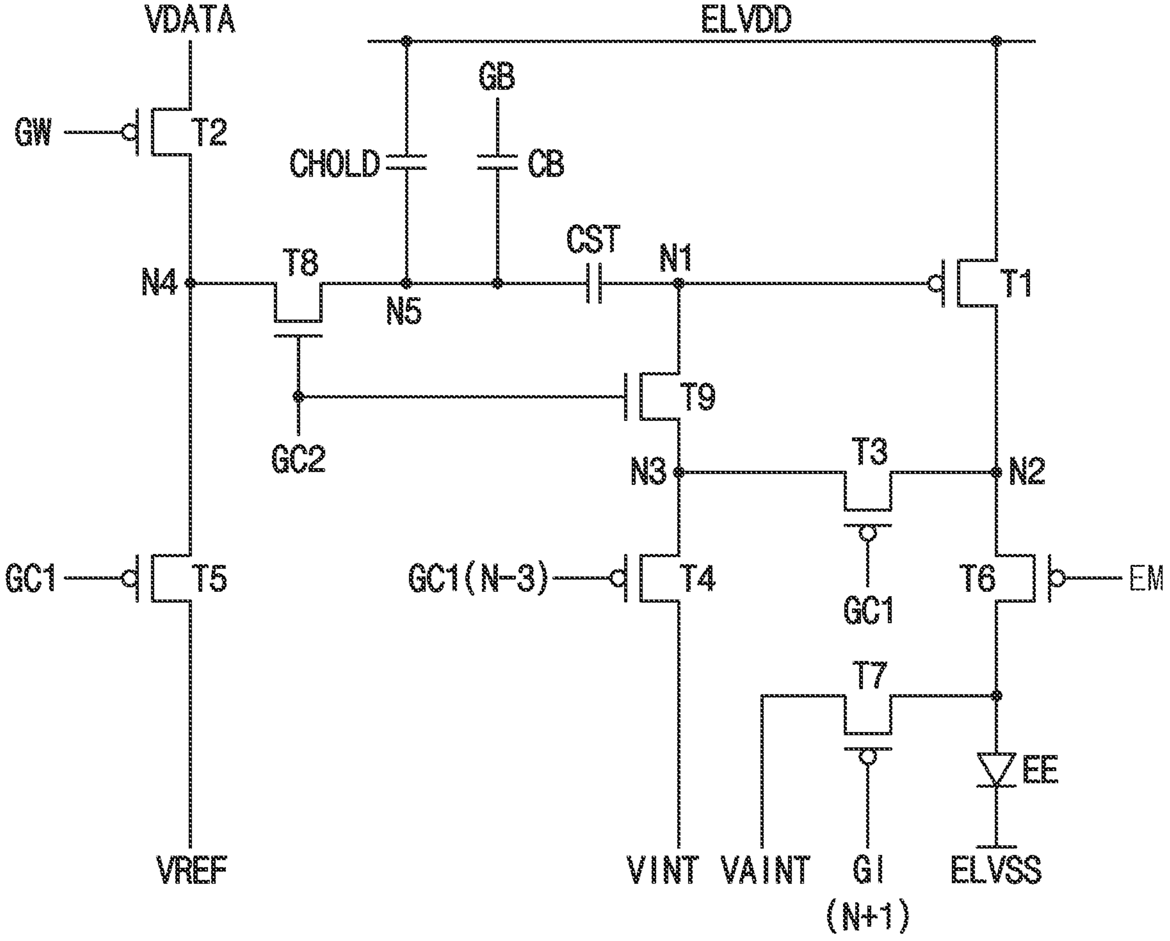
FIG. 10 is a circuit diagram illustrating an example of the pixel of the display panel of FIG. 1 according to an embodiment of the present disclosure.

FIG. 10 is a circuit diagram illustrating an example of the pixel of the display panel 100 of FIG. 1 according to an embodiment of the present disclosure.

The pixel according to the present embodiment is the same as or substantially the same as the pixel of the embodiment previously described in FIG. 3 except for a control signal applied to the data initialization switching element T4. Thus, the same reference numerals will be used to refer to the same or like parts as those described in the previous embodiment of FIG. 3 and any repetitive explanation concerning the above elements may not be provided.

Referring to FIGS. 1, 2, 4 and 10, the pixel may include a light emitting element EE, a driving switching element T1 applying a driving current to the light emitting element EE, a storage capacitor CST connected to a control electrode of the driving switching element T1 and a bias capacitor CB including a first electrode connected to the storage capacitor CST and a second electrode receiving a bias gate signal GB.

The pixel may further include a threshold voltage compensation switching element T3 connected to an output electrode of the driving switching element T1 and a light emitting element initialization switching element T7 connected to an anode electrode of the light emitting element EE.

In one or more embodiments of the present disclosure, a control signal GC1 applied to a control electrode of the threshold voltage compensation switching element T3 and a control signal GI(N+1) applied to a control electrode of the light emitting element initialization switching element T7 may be generated from different signal generators.

The pixel may further include a data initialization switching element T4 connected to an output electrode of the threshold voltage compensation switching element T3 and applying an initialization voltage VINT to the output electrode of the threshold voltage compensation switching element T3.

In the present embodiment, a control signal GC1(N−3) applied to a control electrode of the data initialization switching element T4 and the control signal GC1 applied to the control electrode of the threshold voltage compensation switching element T3 may be generated from the same signal generator.

For example, the control signal applied to the control electrode of the data initialization switching element T4 may be an (N−P)-th first compensation gate signal GC1(N−P) and the control signal applied to the control electrode of the threshold voltage compensation switching element T3 may be an N-th first compensation gate signal GC1. Herein, N is a positive integer and P is a positive integer. For example, P may be three. Herein, N refers to a stage number of a signal generator of the gate driver 300. The stage number N may not be provided from the gate signals GW, GI, GC1, GC2 and GB in FIG. 10 so that GW, GI, GC1, GC2 and GB in FIG. 10 may have the same or substantially the same meaning as GW(N), GI(N), GC1(N), GC2(N) and GB(N). The stage number N may not be provided from the emission signal EM in FIG. 3 so that EM in FIG. 10 may have the same or substantially the same meaning as EM(N).

The threshold voltage compensation switching element T3 and the data initialization switching element T4 share signals each may have a different timing generated from the same signal generator so that an increase of a resolution due to the additional signal generator of the gate driver 300 and the additional gate signal wiring may be prevented or reduced.

According to the present embodiment, the pixel may include the leakage compensation switching element T8 and T9 connected to the storage capacitor CST so that the current leakage may be reduced in the display apparatus for supporting the low frequency driving and the variable frequency driving. Accordingly, the flicker may not occur by the luminance difference according to the driving frequency due to the current leakage in the pixel.

In some embodiments, the signal generator generating the gate signal GC1 applied to the threshold voltage compensation switching element T3 and the signal generator generating the gate signal GI(N+1) applied to the light emitting element initialization switching element T7 may be separated so that the load of the threshold voltage compensation and the load of the light emitting element initialization may be separated in the display apparatus for supporting the low frequency driving and the variable frequency driving. The difference between the load of the threshold voltage compensation and the load of the light emitting element initialization may be reduced so that the horizontal line defect in which the unintended horizontal line pattern is displayed on the display panel may be prevented or reduced. Thus, the display quality of the display panel 100 may be enhanced in the display apparatus for supporting the low frequency driving and the variable frequency driving.

Figure 11:
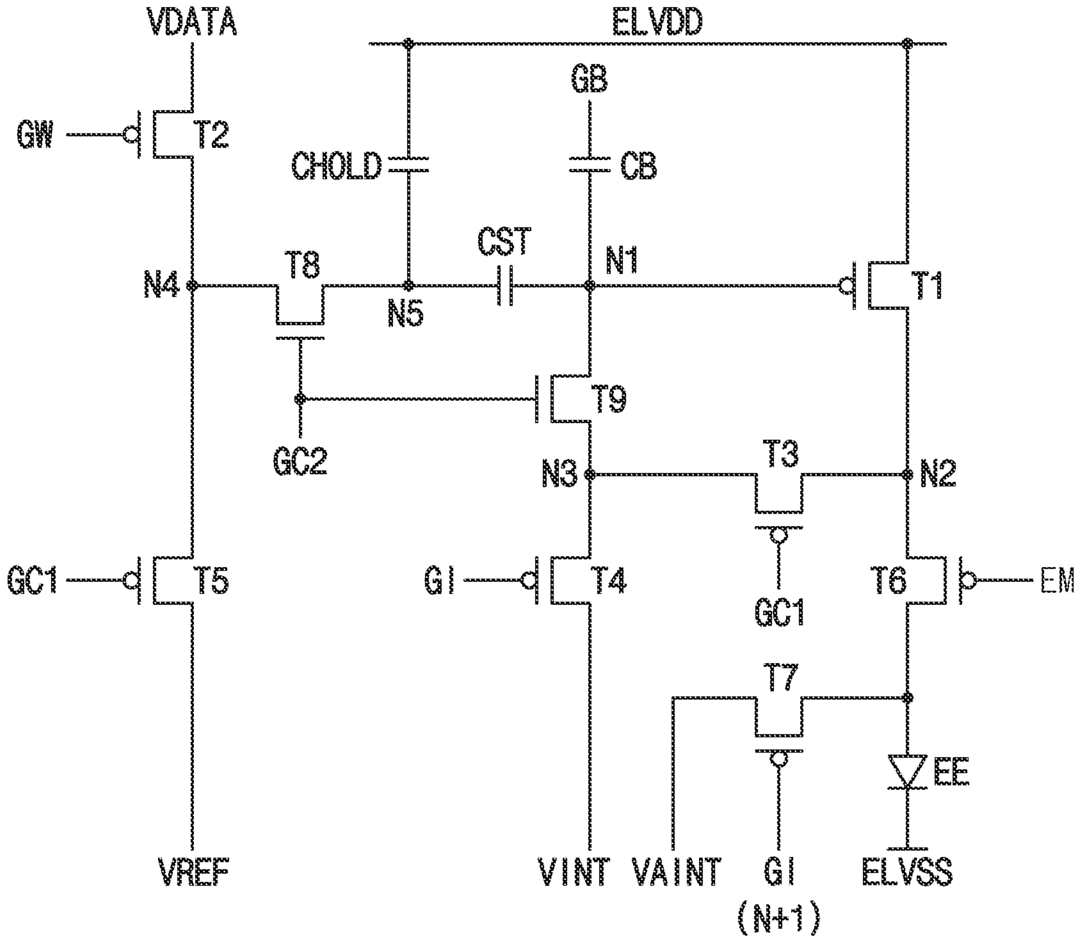
FIG. 11 is a circuit diagram illustrating an example of the pixel of the display panel of FIG. 1 according to an embodiment of the present disclosure.

FIG. 11 is a circuit diagram illustrating an example of the pixel of the display panel 100 of FIG. 1 according to an embodiment of the present disclosure.

The pixel according to the present embodiment is the same as or substantially the same as the pixel of the embodiment previously described in FIG. 3 except for a position where the bias capacitor is connected. Thus, the same reference numerals will be used to refer to the same or like parts as those described in the previous embodiment of FIG. 3 and any repetitive explanation concerning the above elements may not be provided.

Referring to FIGS. 1, 2, 4 to 9 and 11, the pixel may include a light emitting element EE, a driving switching element T1 applying a driving current to the light emitting element EE, a storage capacitor CST connected to a control electrode of the driving switching element T1 and a bias capacitor CB including a first electrode connected to the storage capacitor CST and a second electrode receiving a bias gate signal GB.

The pixel may further include a threshold voltage compensation switching element T3 connected to an output electrode of the driving switching element T1 and a light emitting element initialization switching element T7 connected to an anode electrode of the light emitting element EE.

In one or more embodiments of the present disclosure, a control signal GC1 applied to a control electrode of the threshold voltage compensation switching element T3 and a control signal GI(N+1) applied to a control electrode of the light emitting element initialization switching element T7 may be generated from different signal generators.

In the present embodiment, the first electrode of the bias capacitor CB may be directly connected to the control electrode of the driving switching element T1.

In the present embodiment, a control signal GI applied to a control electrode of the data initialization switching element T4 and the control signal GI(N+1) applied to the control electrode of the light emitting element initialization switching element T7 may be generated from the same signal generator like in FIG. 3.

In some embodiments, a control signal GC1(N−3) applied to a control electrode of the data initialization switching element T4 and the control signal GC1 applied to the control electrode of the threshold voltage compensation switching element T3 may be generated from the same signal generator like in FIG. 10.

According to the present embodiment, the pixel includes the leakage compensation switching element T8 and T9 connected to the storage capacitor CST so that the current leakage may be reduced in the display apparatus for supporting the low frequency driving and the variable frequency driving. Accordingly, the flicker may not occur by the luminance difference according to the driving frequency due to the current leakage in the pixel.

In some embodiments, the signal generator generating the gate signal GC1 applied to the threshold voltage compensation switching element T3 and the signal generator generating the gate signal GI(N+1) applied to the light emitting element initialization switching element T7 may be separated so that the load of the threshold voltage compensation and the load of the light emitting element initialization may be separated in the display apparatus for supporting the low frequency driving and the variable frequency driving. The difference between the load of the threshold voltage compensation and the load of the light emitting element initialization may be reduced so that the horizontal line defect in which the unintended horizontal line pattern is displayed on the display panel may be prevented or reduced. Thus, the display quality of the display panel 100 may be enhanced in the display apparatus for supporting the low frequency driving and the variable frequency driving.

Figure 12:
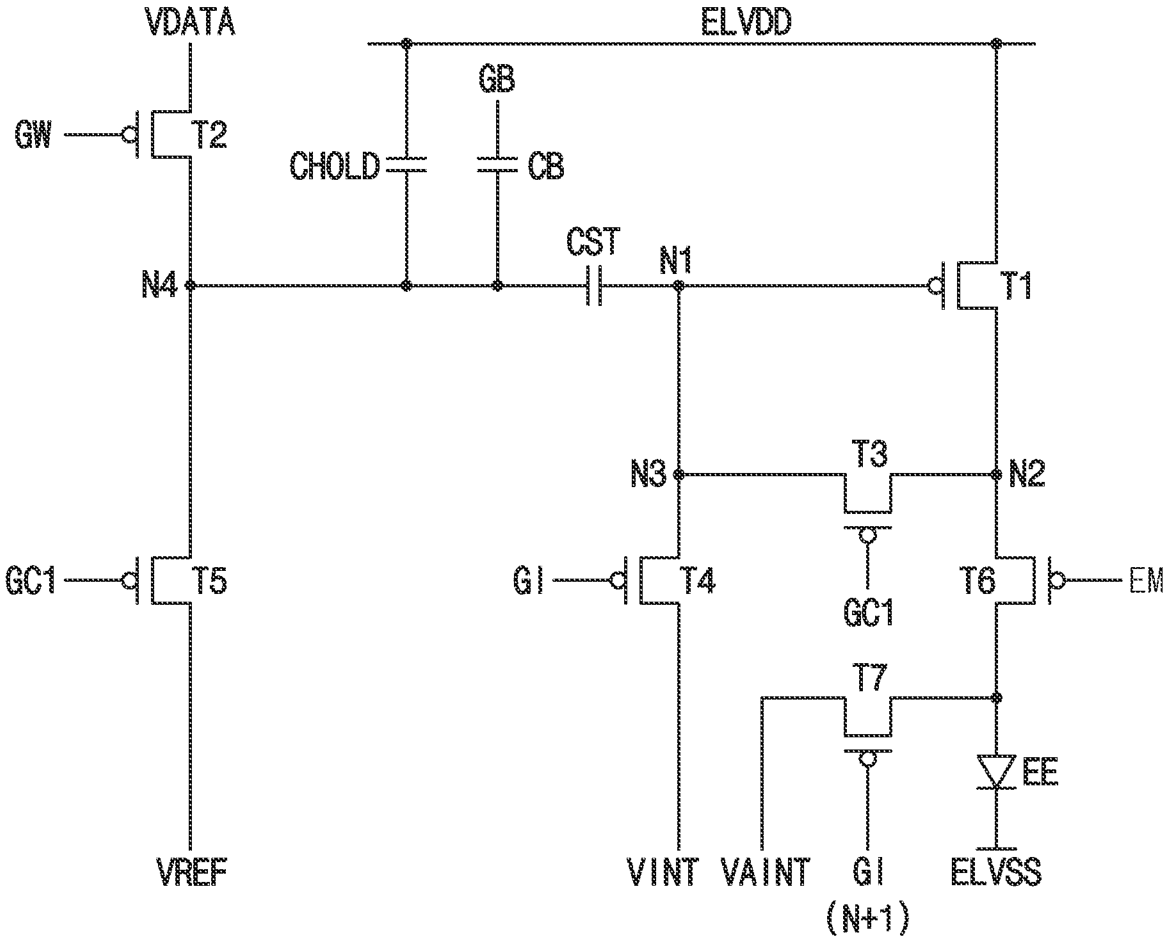
FIG. 12 is a circuit diagram illustrating an example of the pixel of the display panel of FIG. 1 according to an embodiment of the present disclosure.

FIG. 12 is a circuit diagram illustrating an example of the pixel of the display panel 100 of FIG. 1 according to an embodiment of the present disclosure.

The pixel according to the present embodiment is the same as or substantially the same as the pixel of the embodiment previously described in FIG. 3 except that the pixel does not include the first leakage compensation switching element (the eighth transistor) and the second leakage compensation switching element (the ninth transistor). Thus, the same reference numerals will be used to refer to the same or like parts as those described in the previous embodiment of FIG. 3 and any repetitive explanation concerning the above elements may not be provided.

Referring to FIGS. 1, 2, 4 to 9 and 12, the pixel may include a light emitting element EE, a driving switching element T1 applying a driving current to the light emitting element EE, a storage capacitor CST connected to a control electrode of the driving switching element T1 and a bias capacitor CB including a first electrode connected to the storage capacitor CST and a second electrode receiving a bias gate signal GB.

The pixel may further include a threshold voltage compensation switching element T3 connected to an output electrode of the driving switching element T1 and a light emitting element initialization switching element T7 connected to an anode electrode of the light emitting element EE.

In the present disclosure, a control signal GC1 applied to a control electrode of the threshold voltage compensation switching element T3 and a control signal GI(N+1) applied to a control electrode of the light emitting element initialization switching element T7 may be generated from different signal generators.

In the present embodiment, the storage capacitor CST may include a first electrode connected to a control electrode of the driving switching element T1 and a second electrode connected to the first electrode of the bias capacitor CB.

In the present embodiment, a control signal GI applied to a control electrode of the data initialization switching element T4 and the control signal GI(N+1) applied to the control electrode of the light emitting element initialization switching element T7 may be generated from the same signal generator like in FIG. 3.

In some embodiments, a control signal GC1(N−3) applied to a control electrode of the data initialization switching element T4 and the control signal GC1 applied to the control electrode of the threshold voltage compensation switching element T3 may be generated from the same signal generator like in FIG. 10.

According to the present embodiment, the signal generator generating the gate signal GC1 applied to the threshold voltage compensation switching element T3 and the signal generator generating the gate signal GI(N+1) applied to the light emitting element initialization switching element T7 may be separated so that the load of the threshold voltage compensation and the load of the light emitting element initialization may be separated in the display apparatus for supporting the low frequency driving and the variable frequency driving. The difference between the load of the threshold voltage compensation and the load of the light emitting element initialization may be reduced so that the horizontal line defect in which the unintended horizontal line pattern is displayed on the display panel may be prevented or reduced. Thus, the display quality of the display panel 100 may be enhanced in the display apparatus for supporting the low frequency driving and the variable frequency driving.

Figure 13:
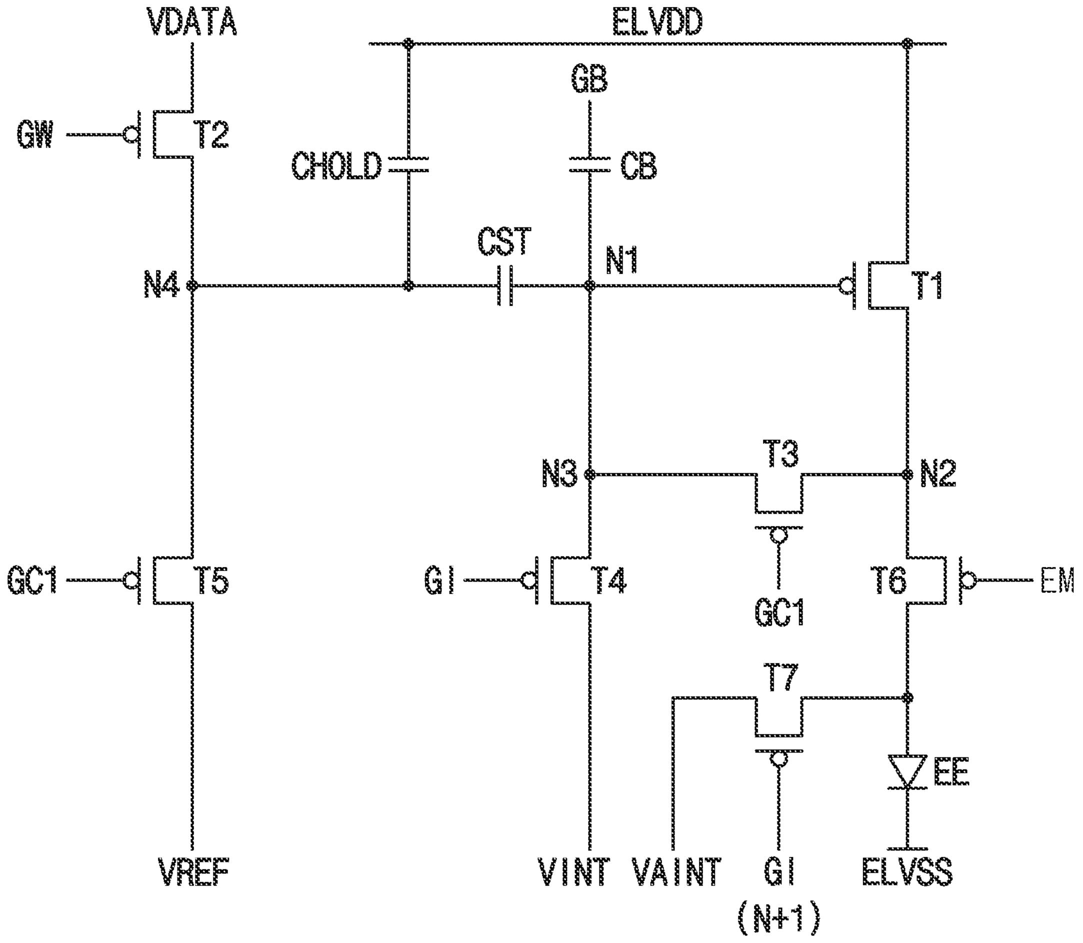
FIG. 13 is a circuit diagram illustrating an example of the pixel of the display panel of FIG. 1 according to an embodiment of the present disclosure.

FIG. 13 is a circuit diagram illustrating an example of the pixel of the display panel 100 of FIG. 1 according to an embodiment of the present disclosure.

The pixel according to the present embodiment is the same as or substantially the same as the pixel of the embodiment previously described in FIG. 11 except that the pixel does not include the first leakage compensation switching element (the eighth transistor) and the second leakage compensation switching element (the ninth transistor). Thus, the same reference numerals will be used to refer to the same or like parts as those described in the previous embodiment of FIG. 11 and any repetitive explanation concerning the above elements may not be provided.

Referring to FIGS. 1, 2, 4 to 9 and 13, the pixel may include a light emitting element EE, a driving switching element T1 applying a driving current to the light emitting element EE, a storage capacitor CST connected to a control electrode of the driving switching element T1 and a bias capacitor CB including a first electrode connected to the storage capacitor CST and a second electrode receiving a bias gate signal GB.

The pixel may further include a threshold voltage compensation switching element T3 connected to an output electrode of the driving switching element T1 and a light emitting element initialization switching element T7 connected to an anode electrode of the light emitting element EE.

In the present disclosure, a control signal GC1 applied to a control electrode of the threshold voltage compensation switching element T3 and a control signal GI(N+1) applied to a control electrode of the light emitting element initialization switching element T7 may be generated from different signal generators.

In the present embodiment, the first electrode of the bias capacitor CB may be connected to or directly connected to the control electrode of the driving switching element T1.

In the present embodiment, a control signal GI applied to a control electrode of the data initialization switching element T4 and the control signal GI(N+1) applied to the control electrode of the light emitting element initialization switching element T7 may be generated from the same signal generator like in FIG. 3.

In some embodiments, a control signal GC1(N−3) applied to a control electrode of the data initialization switching element T4 and the control signal GC1 applied to the control electrode of the threshold voltage compensation switching element T3 may be generated from the same signal generator like FIG. 10.

According to the present embodiment, the signal generator generating the gate signal GC1 applied to the threshold voltage compensation switching element T3 and the signal generator generating the gate signal GI(N+1) applied to the light emitting element initialization switching element T7 may be separated so that the load of the threshold voltage compensation and the load of the light emitting element initialization may be separated in the display apparatus for supporting the low frequency driving and the variable frequency driving. The difference between the load of the threshold voltage compensation and the load of the light emitting element initialization may be reduced so that the horizontal line defect in which the unintended horizontal line pattern is displayed on the display panel may be prevented or reduced. Thus, the display quality of the display panel 100 may be enhanced in the display apparatus for supporting the low frequency driving and the variable frequency driving.

Figure 14:
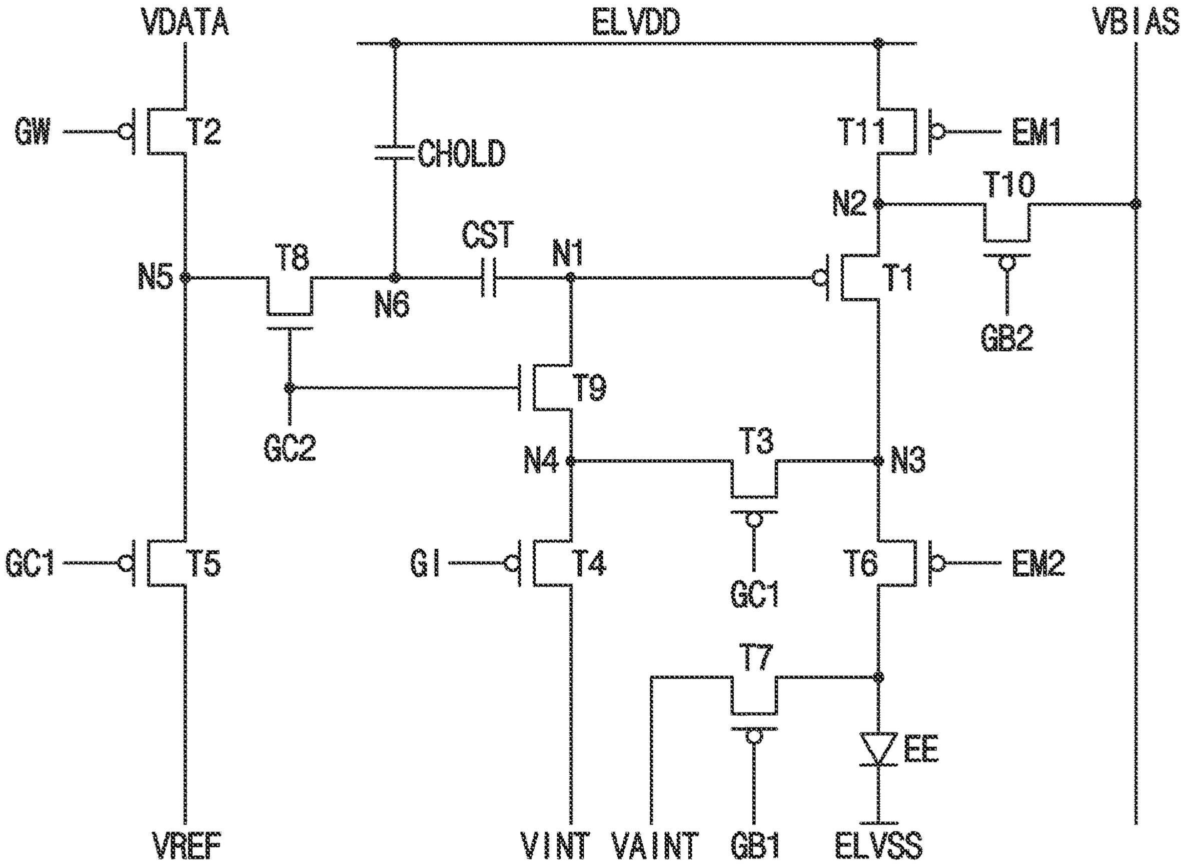
FIG. 14 is a circuit diagram illustrating an example of the pixel of the display panel of FIG. 1 according to an embodiment of the present disclosure.

FIG. 14 is a circuit diagram illustrating an example of the pixel of the display panel 100 of FIG. 1 according to an embodiment of the present disclosure.

The pixel according to the present embodiment is the same as or substantially the same as the pixel of the embodiment previously described in FIG. 3 except that the pixel further includes a first bias switching element and a second bias switching element but does not include a bias capacitor CB. Thus, the same reference numerals will be used to refer to the same or like parts as those described in the previous embodiment of FIG. 3 and any repetitive explanation concerning the above elements may not be provided.

Referring to FIGS. 1, 2, 4 to 9 and 14, the pixel may include a light emitting element EE, a driving switching element T1 applying a driving current to the light emitting element EE, a first bias switching element T10 connected to the driving switching element T1 and applying a bias voltage VBIAS to the driving switching element T1, a threshold voltage compensation switching element T3 connected to an output electrode of the driving switching element T1 and a light emitting element initialization switching element T7 connected to an anode electrode of the light emitting element EE.

In the present disclosure, a control signal GC1 applied to a control electrode of the threshold voltage compensation switching element T3 and a control signal GI(N+1) applied to a control electrode of the light emitting element initialization switching element T7 may be generated from different signal generators.

The pixel may further include a second bias switching element T11 including a control electrode receiving an emission signal EM1, an input electrode receiving a first power voltage ELVDD and an output electrode connected to the input electrode of the driving switching element T1.

The pixel may further include a data initialization switching element T4 connected to an output electrode of the threshold voltage compensation switching element T3 and applying an initialization voltage VINT to the output electrode of the threshold voltage compensation switching element T3.

The pixel may further include a data voltage applying switching element T2 applying the data voltage VDATA to the storage capacitor CST and a first leakage compensation switching element T8 disposed between the storage capacitor CST and the data voltage applying switching element T2.

The pixel may further include a second leakage compensation switching element T9 including an input electrode connected to the control electrode of the driving switching element T1 and a control electrode connected to a control electrode of the first leakage compensation switching element T8.

The driving switching element T1 and the data voltage applying switching element T2 each may be P-type transistors. The first leakage compensation switching element T8 and the second leakage compensation switching element T9 each may be N-type transistors.

In the present embodiment, a control signal GI applied to a control electrode of the data initialization switching element T4 and the control signal GI(N+1) applied to the control electrode of the light emitting element initialization switching element T7 may be generated from the same signal generator like in FIG. 3.

In some embodiments, a control signal GC1(N−3) applied to a control electrode of the data initialization switching element T4 and the control signal GC1 applied to the control electrode of the threshold voltage compensation switching element T3 may be generated from the same signal generator like in FIG. 10.

According to the present embodiment, the pixel may include the leakage compensation switching element T8 and T9 connected to the storage capacitor CST so that the current leakage may be reduced in the display apparatus for supporting the low frequency driving and the variable frequency driving. Accordingly, the flicker may not occur by the luminance difference according to the driving frequency due to the current leakage in the pixel.

In some embodiments, the signal generator generating the gate signal GC1 applied to the threshold voltage compensation switching element T3 and the signal generator generating the gate signal GI(N+1) applied to the light emitting element initialization switching element T7 may be separated so that the load of the threshold voltage compensation and the load of the light emitting element initialization may be separated in the display apparatus for supporting the low frequency driving and the variable frequency driving. The difference between the load of the threshold voltage compensation and the load of the light emitting element initialization may be reduced so that the horizontal line defect in which the unintended horizontal line pattern is displayed on the display panel may be prevented or reduced. Thus, the display quality of the display panel 100 may be enhanced in the display apparatus for supporting the low frequency driving and the variable frequency driving.

According to the display apparatus of the present embodiment as explained above, the display quality of the display panel may be enhanced and the power consumption may be reduced.

In this specification, when an element (or region, layer, part, etc.) is referred to as being "on", "connected to", or "coupled to", or "adjacent to" another element, it refers to that it may be directly placed on/connected to/coupled to other components, or one or more third components may be arranged between them. That is, it should be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

Spatially relative terms, such as "beneath", "below", "lower", "downward", "above", "upper", "left", "right", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "substantially," "about," and similar terms are used as terms of approximation and not as terms of degree, and are intended to account for the inherent deviations in measured or calculated values that would be recognized by those of ordinary skill in the art. "About" or "substantially", as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" or "substantially" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The display apparatus and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the [device] may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A display apparatus comprising:

a display panel comprising a pixel;

a gate driver configured to provide a gate signal to the pixel;

a data driver configured to provide a data voltage to the pixel; and an emission driver configured to provide an emission signal to the pixel, wherein the pixel comprises:

a light emitting element;

a driving switching element configured to apply a driving current to the light emitting element;

a storage capacitor connected to a control electrode of the driving switching element;

a bias capacitor including a first electrode connected to the storage capacitor and a second electrode configured to receive a bias gate signal;

a threshold voltage compensation switching element connected to an output electrode of the driving switching element; and a light emitting element initialization switching element connected to an anode electrode of the light emitting element, and wherein a control signal applied to a control electrode of the threshold voltage compensation switching element and a control signal applied to a control electrode of the light emitting element initialization switching element are generated from different signal generators.

2. The display apparatus of claim 1, wherein the storage capacitor includes: a first electrode connected to the control electrode of the driving switching element; and a second electrode connected to the first electrode of the bias capacitor.

3. The display apparatus of claim 1, wherein the first electrode of the bias capacitor is connected to the control electrode of the driving switching element.

4. The display apparatus of claim 1, wherein the pixel further comprises:

a data initialization switching element connected to an output electrode of the threshold voltage compensation switching element and configured to apply an initialization voltage to the output electrode of the threshold voltage compensation switching element.

5. The display apparatus of claim 4, wherein a control signal applied to a control electrode of the data initialization switching element and the control signal applied to the control electrode of the light emitting element initialization switching element are generated from the same signal generator.

6. The display apparatus of claim 5, wherein the control signal applied to the control electrode of the data initialization switching element is an N-th initialization gate signal, wherein the control signal applied to the control electrode of the light emitting element initialization switching element is an (N+1)-th initialization gate signal, and wherein N is a positive integer.

7. The display apparatus of claim 4, wherein a control signal applied to a control electrode of the data initialization switching element and the control signal applied to the control electrode of the threshold voltage compensation switching element are generated from the same signal generator.

8. The display apparatus of claim 7, wherein the control signal applied to the control electrode of the data initialization switching element is an (N−3)-th first compensation gate signal, wherein the control signal applied to the control electrode of the threshold voltage compensation switching element is an N-th first compensation gate signal, and wherein N is a positive integer.

9. The display apparatus of claim 4, wherein the pixel further comprises:

a data voltage applying switching element configured to apply the data voltage to the storage capacitor; and a first leakage compensation switching element between the storage capacitor and the data voltage applying switching element.

10. The display apparatus of claim 9, wherein the pixel further comprises:

a second leakage compensation switching element including an input electrode connected to the control electrode of the driving switching element and a control electrode connected to a control electrode of the first leakage compensation switching element.

11. The display apparatus of claim 10, wherein the driving switching element and the data voltage applying switching element are P-type transistors, and wherein the first leakage compensation switching element and the second leakage compensation switching element are N-type transistors.

12. The display apparatus of claim 10, wherein the gate driver comprises:

a first signal generator configured to generate a second compensation gate signal applied to the control electrode of the first leakage compensation switching element;

a second signal generator configured to generate a first compensation gate signal applied to the control electrode of the threshold voltage compensation switching element;

a third signal generator configured to generate an initialization gate signal applied to the control electrode of the light emitting element initialization switching element;

a fourth signal generator configured to generate the bias gate signal; and a fifth signal generator configured to generate a data writing gate signal applied to a control electrode of the data voltage applying switching element.

13. The display apparatus of claim 10, wherein the gate driver comprises:

a pair of first signal generators configured to generate a second compensation gate signal applied to the control electrode of the first leakage compensation switching element and at a first side and at a second side of the display panel;

a second signal generator configured to generate a first compensation gate signal applied to the control electrode of the threshold voltage compensation switching element and at the first side of the display panel;

a third signal generator configured to generate an initialization gate signal applied to the control electrode of the light emitting element initialization switching element and at the second side of the display panel;

a pair of fourth signal generators configured to generate the bias gate signal and at the first side and at the second side of the display panel; and a pair of fifth signal generators configured to generate a data writing gate signal applied to a control electrode of a data voltage applying switching element and at the first side and at the second side of the display panel.

14. The display apparatus of claim 10, wherein the pixel further comprises:

an emission switching element between the driving switching element and the light emitting element; and a reference voltage applying switching element connected to an output electrode of the data voltage applying switching element and configured to apply a reference voltage to the output electrode of the data voltage applying switching element.

15. A display apparatus comprising:

a display panel comprising a pixel;

a gate driver configured to provide a gate signal to the pixel;

a data driver configured to provide a data voltage to the pixel; and an emission driver configured to provide an emission signal to the pixel, wherein the pixel comprises:

a light emitting element;

a driving switching element configured to apply a driving current to the light emitting element;

a storage capacitor connected to a control electrode of the driving switching element;

a first bias switching element connected to the driving switching element and configured to apply a bias voltage to the driving switching element;

a threshold voltage compensation switching element connected to an output electrode of the driving switching element; and a light emitting element initialization switching element connected to an anode electrode of the light emitting element, wherein a control signal applied to a control electrode of the threshold voltage compensation switching element and a control signal applied to a control electrode of the light emitting element initialization switching element are generated from different signal generators.

16. The display apparatus of claim 15, wherein the pixel further comprises:

a data initialization switching element connected to an output electrode of the threshold voltage compensation switching element and configured to apply an initialization voltage to the output electrode of the threshold voltage compensation switching element.

17. The display apparatus of claim 16, wherein the pixel further comprises:

a data voltage applying switching element configured to apply the data voltage to the storage capacitor; and a first leakage compensation switching element between the storage capacitor and the data voltage applying switching element.

18. The display apparatus of claim 17, wherein the pixel further comprises:

a second leakage compensation switching element including an input electrode connected to the control electrode of the driving switching element; and a control electrode connected to a control electrode of the first leakage compensation switching element.

19. The display apparatus of claim 18, wherein the driving switching element and the data voltage applying switching element are P-type transistors, and wherein the first leakage compensation switching element and the second leakage compensation switching element are N-type transistors.

20. A method of driving a display apparatus, the method comprising:

providing a gate signal to a pixel of a display panel;

providing a data voltage to the pixel; and providing an emission signal to the pixel, wherein the pixel comprises:

a light emitting element;

a driving switching element configured to apply a driving current to the light emitting element;

a storage capacitor connected to a control electrode of the driving switching element;

a bias capacitor including a first electrode connected to the storage capacitor and a second electrode configured to receive a bias gate signal;

a threshold voltage compensation switching element connected to an output electrode of the driving switching element; and a light emitting element initialization switching element connected to an anode electrode of the light emitting element, wherein a control signal applied to a control electrode of the threshold voltage compensation switching element and a control signal applied to a control electrode of the light emitting element initialization switching element are generated from different signal generators.

* * * * *